INVENTOR.
LOUIS KAPLAN
BY
HIS ATTORNEY

United States Patent Office 3,304,628
Patented Feb. 21, 1967

3,304,628
COCKPIT MOTION SYSTEM FOR AIRCRAFT SIMULATORS
Louis Kaplan, Englewood Cliffs, N.J., assignor to Curtiss-Wright Corporation, a corporation of Delaware
Filed May 21, 1965, Ser. No. 457,671
9 Claims. (Cl. 35—12)

This invention relates to aircraft simulators for ground training of flight personnel, and in particular to an improved cockpit motion system and apparatus for more realistically simulating certain flight conditions or cues, such as those involving acceleration forces incident to pitch, roll, "heave," unstable or rough air, etc., as reflected by a pilot's reaction thereto in actual flight.

The essential purpose of such ground training is to provide the pilot with typical acceleration cues, such as he would receive in actual flight, so that he may become thoroughly familiar with them, especially in the manner they tend ordinarily to affect his judgment vis-a-vis indications of the flight instruments. In modern aviation, the pilot is trained to disregard these cues, and to rely instead solely on his instruments.

Aircraft simulators and trainers having cockpit motion for adding more realism to on-ground flight training are well known in the art. In an early form, the cockpit or pilot's station was mounted on a universal joint so as to pitch, roll and bank as the student pilot moved simulated aircraft controls to represent corresponding maneuvers. The cockpit motion in this case was not realistic as the cues reflected only gravity forces acting on the pilot. Actually, the resultant of aircraft acceleration and gravity forces determines in flight the pilot's cue reaction or "feel," and in certain instances the pilot's sense of attitude would be different from actual flight.

In some later forms both gravity and acceleration forces represented by signals from a simulator flight computer are used for controlling by multiple actuators the motion and attitude of the pilot's platform or cockpit. Mechanisms including gimbal mounts, vertically positioned pistons, etc., were commonly used for supporting and moving the cockpit. In practice, gimbal mountings present serious construction difficulties, especially where vertical translation as well as rotative movements of a comparatively large and massive simulator cockpit or fuselage are required. Vertical supporting pistons are unsatisfactory for realistic range of movement, as they are subjected to severe lateral bending stresses; also, because of the full weight of the cockpit on the pistons and said lateral stresses, serious hydraulic leakage at the cylinders can occur. Further difficulties are experienced with such constructions where housing space, over-all height, ease of maintenance, etc., are important installation factors.

A principal object of this invention is an improved platform or cockpit motion system and apparatus for flight simulators and the like wherein signals representing flight acceleration forces are derived from a suitable source, such as conventional flight simulator computers for controlling platform actuators so as precisely, rapidly and realistically to move the platform. Servo actuators singly or in combination operate respective motion transmitting mechanisms that support the platform or cockpit. The servos adjust according to the sense and rate of operation thereof the attitude of the cockpit by angular movements in pitch and roll and vertical movements in simulation of "buffeting," "heave" and the like, and in combinations at said movements.

A further object of the invention is to provide improved cockpit motion mechanisms wherein the combined servo and motion transmitting means are structurally simple and compact for materially reducing the over-all height of the simulator while affording accessibility for maintenance.

The invention will be more fully set forth in the following description referring to the accompanying drawings, and the features of novelty will be pointed out with particularity in the claims annexed to and forming a part of this specification.

Figure 1:
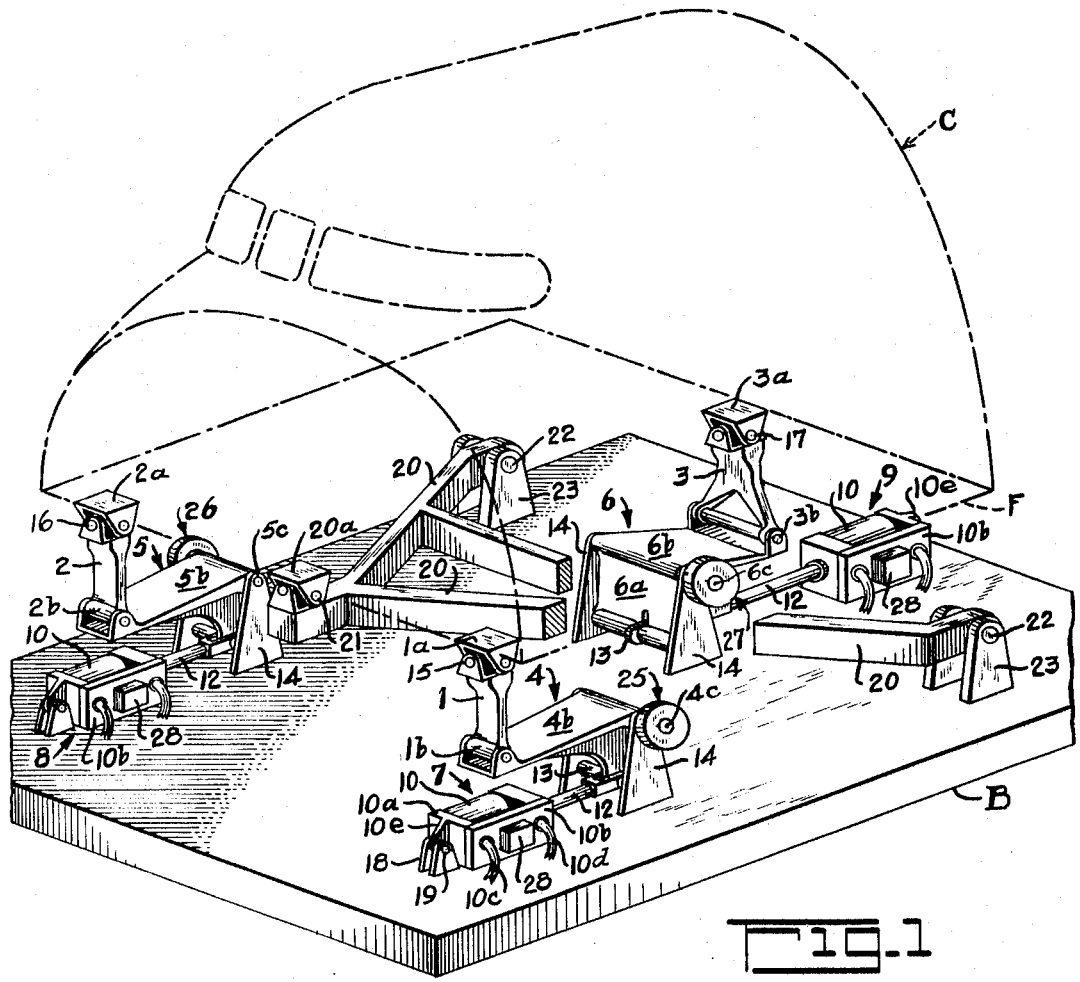
FIG. 1 is a perspective view with elements partly broken away for better illustration of cockpit motion mechanism for supporting and moving a flight simulator cockpit that is indicated in phantom.

Referring to FIG. 1, a simulated cockpit having the usual instrument panels, simulated aircraft controls, including aileron, elevator, rudder and throttle, seats for pilot and co-pilot, etc., is indicated in phantom outline at C. The cockpit per se need not be illustrated in detail as it may assume different forms as, for example, that shown in Patent No. 2,731,737, granted June 24, 1956 to R. G. Stern.

The cockpit at its floor F is supported by and connected to motion transmitting mechanisms including three principal struts 1, 2 and 3. Each strut is a separate motion transmitting element of servo-actuated crank and linkage structure presently described and has at its upper end a gimbal-mounted pad, 1a, 2a and 3a respectively, suitably secured as by bolting or welding to the cockpit floor frame. The struts are pivotally connected at their lower ends at 1b, 2b and 3b to individual rocker arms or bellcranks 4, 5 and 6 respectively, each of which in turn is coupled to an actuating servo device indicated generally at 7, 8 and 9. The servo devices are securely mounted for limited pivotal movement to a fixed base B.

As the three crank and servo combinations are essentially similar, a detail description of the mechanism at servo 7 will be sufficient. The servo in the present instance is hydraulically operated and comprises a cylinder 10 and piston 11, FIG. 2, that operates the bell-crank 4 through a ram or piston rod 12. This rod is connected to one arm 4a of the bell-crank at 13 by any suitable compensating connection (pin-and-slot, ball-and-socket type, etc.) so as to rotate the bell-crank about its fixed pivot at 4c. The pivot is carried by a bracket 14 that is rigidly secured to the base B. The other arm of the bell-crank 4b is connected as previously described to the support strut 1 so that extension, for example, of the piston rod 12 causes counterclockwise rotation of the crank and lowering of the strut, together with that side of the cockpit floor F.

Figure 2:
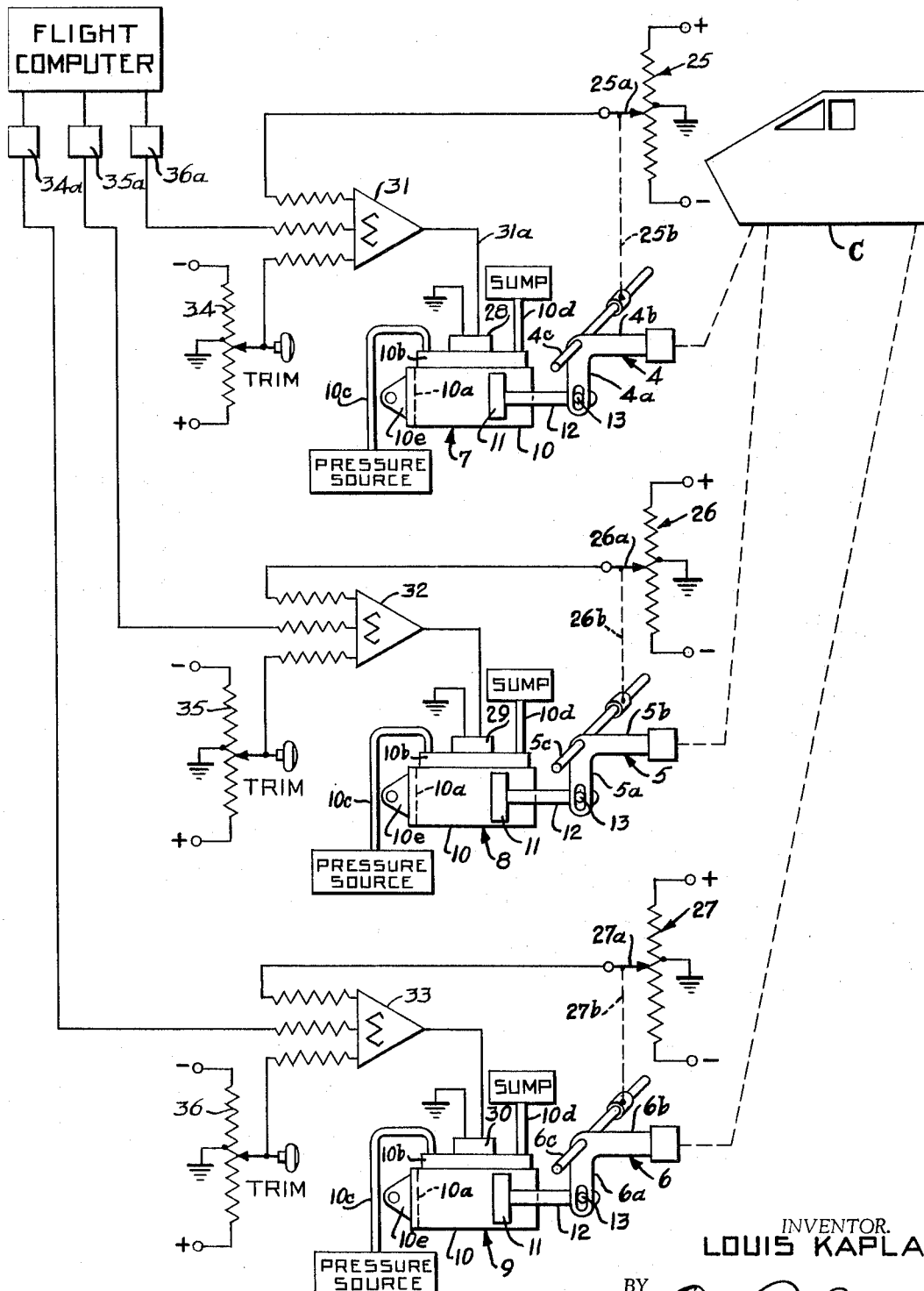
FIG. 2 is a partly diagrammatic and schematic illustration of the actuating servo system and its basic control, for transmitting motion to the cockpit-connected mechanisms.

For transmitting without "binding" to-and-fro movement to the bell-crank, the hydraulic cylinder 10 is mounted within a frame 10a that in turn is pivoted at 19 in a bracket 18 on the base B. The cylinder is hydraulically connected to a suitable two-stage electro-hydraulic servo valve indicated at 10b for controlling the application of the hydraulic pressure medium from line 10c to the servo piston. A flow control "Series 72" Moog servo valve may be used for this purpose. An exhaust line 10d leads to a reservoir or sump. The hydraulic control valve which is solenoid operated has proportional control and is responsive to computed electric signals from the flight simulator, as indicated by FIG. 2.

The floor support pads 1a, etc., are connected to the cockpit platform preferably at corners of an isosceles triangle having its apex on the longitudinal axis of the cockpit at the rear portion thereof, and its base points symmetrically positioned with respect to said axis along the front portion of the cockpit. Thus, vertical movements of these points in various combinations are effective to cause tilting about the longitudinal and transverse axes of the platform, and raising and lowering thereof to simulate pitching, rolling, banking and the sudden up-and-down or "heave" movements encountered in practice in unstable air.

The operation of the hydraulic servo 7 for raising and lowering the strut 1 and that part of the cockpit floor may as described above be controlled independently of or concurrently with the other servos 8 and 9 by reason of the gimbal mounts 15, 16 and 17 interconnecting the respective struts and the floor-connected pads. The same is true of the servos 8 and 9; thus, it follows that any or all the servos may be singly or concurrently operated to produce as required all the effects described above. In addition to these effects, the proportional valve control provides for gradual return, or "sneak-back," of the cockpit to an initial position, following an acceleration effect. This is done at a rate below the so-called threshold of perception so that the cockpit is in effect reset for a following acceleration effect.

For the purpose of stabilizing the motion of the cockpit as regards undesired sway, etc., a rugged yoke 20, or A frame, is pivotally secured to the base B and is connected by the pad 20a to the front portion of the cockpit on the longitudinal axis. The pad is mounted on the forward closed portion of the yoke by a gimbal mount 21 as illustrated in FIG. 1; however, any suitable self-aligning bearing or universal joint may be used here. The pivoted arms of the yolk are rotatable on support pins 22 that are mounted in the fixed brackets 23 at the rear of the base, also in symmetrical relation to the longitudinal axis. The yoke 20 is of sufficient length, measured along the cockpit axis, so as to modify but slightly intended vertical movements of the cockpit. In practice there is no sacrifice in realism, as actual aircraft have no predictable pattern of movement under unstable air conditions, etc.

The structural arrangement of the yoke 20, bell-cranks 4, 5 and 6 and the horizontally positioned hydraulic servos lends itself to a compact and efficient arrangement, wherein the floor clearance is at a minimum, consistent with sufficient accessibility for maintenance. Moreover, the mounting of the bell-cranks simplifies take-off of position signals upon change in angular position of the bell-crank. To this end, position changes of each pad, which together with the relative positions of the other two pads indicate the resultant attitude of the cockpit, can be represented by pick-off signal voltages from a potentiometer according to the angular position of the bell-crank. Thus, individual position signals may be obtained for the three points of cockpit support.

This arrangement is illustrated in the schematic diagram of FIG. 2, wherein the potentiometer 25 connected to bell-crank 4, for example, is energized at its terminals in conventional manner by voltages of opposite sense and has a grounded center tap for representing a neutral or "level" position. The potentiometer slider 25a, which is indicated as mechanically connected at 25b for appropriate movement with the bell-crank pin 4c, derives from the potentiometer winding a voltage that corresponds in sense and magnitude to the direction and angular displacement of the bell-crank from a neutral position, i.e., the potentiometer grounded mid-tap. In practice the potentiometer winding is mounted on a circular insulating drum within a casing as indicated in outline in FIG. 1, concentrically of the bell-crank pin to which the slider contact is connected.

It will be also understood that the bell-crank arrangements shown in FIG. 2 are but diagrammatic and are not intended strictly to conform as to relative positions with the transmitted motions of the operative device of FIG. 1. It is sufficient here to indicate that each servo-controlled bell-crank 4, 5 and 6 is similarly coupled to a position potentiometer 25, 26 and 27 for deriving individual signals according to the adjustment of the respective slider contact 25a, 26a and 27a.

The central valves at 10b of each servo unit are operated according to the degree of energization of the respective solenoids at 28, 29 and 30. To this end, the input network of a summing amplifier such as 31 is fed as indicated by signals from the flight computer, position potentiometer 25 and "trim" potentiometer 34 respectively, and the amplifier output is connected at 31a to the winding of the solenoid. The position signal from slider 25a and the acceleration signal from the flight computer are of opposite sense. At first, the acceleration signal is dominant so that the amplifier output operates the valve at an initial rate depending on the magnitude of the acceleration signal to apply pressure fluid to the servo piston 11 and rotate the bell-crank 4 at the desired rate toward a new position. Thus, as the position signal now increases, the resultant output of the summing amplifier decreases and the valve gradually closes until the crank (pad) position represents completion of the movement intended to simulate the computed acceleration.

The acceleration cue has now been transmitted to the pilot so that the cockpit motion mechanism must now be "reset" in readiness for a following cue. This is advantageously done by predetermined "sneak-back" signals from the computer that return the bell-crank to an initial position at a low rate corresponding to that just below the "threshold perception" rate; i.e., the pilot is not consciously aware of the "sneak-back," and no false acceleration cues are produced during reset.

The operation of the other servos 8 and 9 in response to outputs the respective summing amplifiers 32 and 33 is essentially the same as described above, except, of course, that the computed acceleration signals for these amplifiers will correspond to the desired movement of the respective cockpit support.

The flight computer per se constitutes no part of the present invention, and may be of modern digital design having required programming for features such as the "sneak-back" control described above. As analog signals are fed to the servo control, so-called digital-to-analog converters indicated at 34, 35 and 36 interconnect the digital computer and servo amplifiers for supplying analog-type signals according to well-known practice.

Figure 3:
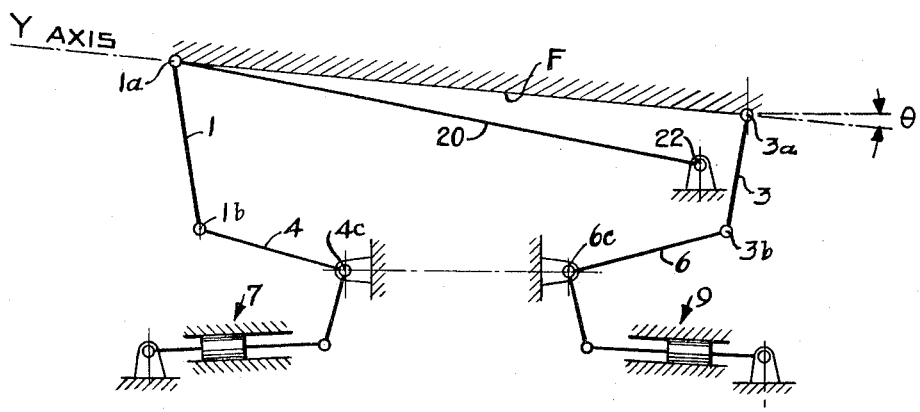
FIGS. 3 and 4 are line diagrams illustrating typical attitudes of the cockpit in pitch and roll respectively incident to application of flight condition signals to the appropriate servo devices.
Figure 4:
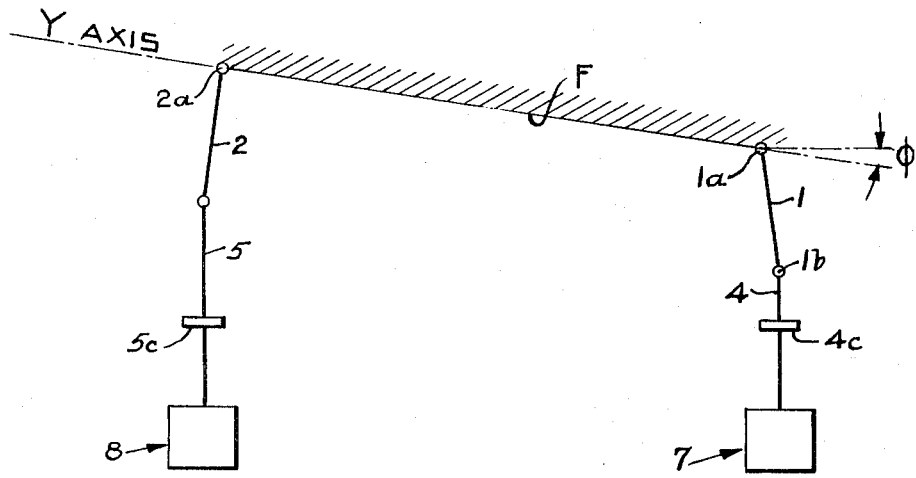

Referring to FIGS. 3 and 4, typical servo operations for moving the cockpit so as to obtain the more common acceleration cues will now be described. The diagram of FIG. 3 illustrates servo operation for pitch and "heave" movements, as applied to the cockpit floor F. Initially, the cockpit may be considered as having its longitudinal axis, indicated for convenience at X, in horizontal or neutral position. The neutral position can be arbitrary, depending on the design of the aircraft to be simulated, required trim, etc. As shown, the cockpit is in pitching position, nose high, at a pitch angle $\theta$. The two forward servos 7 and 8 (aligned servo 8 not shown) are operated in synchronism to raise the cockpit "nose" according to the computed angle of attack and flight path angle, which together define the pitch angle. The rear servo 9 remains stationary so that the fulcrum or pitching axis is at 3b; where a large pitch angle is involved, the rear servo is then operated to lower the rear portion, FIG. 3, thereby increasing the value of $\theta$. It will be seen that the pitching axis can be shifted by operating the rear servo 9 at a rate relative to the synchronized rate of the forward servos, assuming a non-banked condition.

For simulation of "heave," computer signals representing normal acceleration are supplied to all three servos simultaneously for bodily moving the cockpit in vertical direction. When there is no change in acceleration, the heave signals are reduced slowly to neutral for the so-called "sneak-back" reset, so that an acceleration cue can be provided at the next signaled change in acceleration.

For simulation of "buffet," the programmed request signals to the two front servos may assume a variety of patterns. For example, in stall-buffet the signal frequency may remain constant at five (5) cycles, while the amplitude increases as the aircraft goes deeper into the stall.

In FIG. 4, the cockpit position diagram is viewed from the nose end transversely of the wing or Y axis to illustrate roll (φ) or bank acceleration movement. Roll is about the longitudinal or X axis, FIG. 3, and is accomplished by actuating the two front servos 7 and 8, FIGS. 1 and 2, in opposite directions, while maintaining the rear servo 9 stationary. The vertical position of the roll axis can be varied in accordance with different rates of operation of the front servos. Acceleration signals derived according to computed changes in roll angle energize the servo controls in the manner explained above to produce the roll acceleration cues for the pilot. Where the computed roll angle is constant, the servos are controlled by "sneak-back" signals as described above to bring the cockpit slowly to an angle representing the side-slip (if any) condition. For a perfect bank, i.e., balancing of centrifugal force and gravity components, the cockpit would "sneak-back" to its level or neutral position.

Summarizing, the cockpit servos provide an initial acceleration cue according to the computed aircraft maneuver. When there is no further change in the rate of angular or translational movement, i.e., where acceleration is zero, the servos are operated by prescheduled "sneak-back" signals to return the cockpit to some neutral position, such as the side-slip angle described above, where roll acceleration is zero.

Any rate change in the computed motion of the aircraft must, of course, be above the "threshold" to be perceived in the cockpit by the pilot, and any change that is below the threshold will not be experienced, even though the change in position or attitude is real. As indicated in FIG. 2, a new computed rate signal appearing at the input of a summing amplifier, such as 31, and the position signal from potentiometer 25 jointly produce a command or error signal representing the algebraic sum of the two signals. The command signal operates the servo valve mechanism 28 so as to increase or decrease application of hydraulic flow to the servo piston, depending on the polarity (or sense) and magnitude of the command signal. The position signal changes according to the piston-bell-crank position so that an updated command signal is produced. It will therefore be apparent that with a continually corrected command signal the cockpit actuating mechanism will follow closely the computed signal to recreate the flight maneuver cues of the simulated aircraft. The computer command signal also provides for relocation in space of the cockpit center of gravity due to simulated cargo, bomb, etc., loads by causing relative positioning of the servo actuators.

An important structural feature of the cockpit motion mechanism as described above is the so-called A frame or yoke 20, FIGS. 1 and 3, which restrains the cockpit and its connected mechanisms from motion in either horizontal direction or yaw rotation. This guidance structure, in addition, serves to eliminate or greatly reduce bending or lateral stresses on the bell-cranks and supporting linkages incident to irregular movements of the comparatively heavy cockpit, and thus to maintain better mechanical stability. Undesired mechanical vibrations, especially when the cockpit is in an elevated position, are therefore minimized.

In practice the mechanical and hydraulic systems would be protected against damage and undesired operation by safety devices, interlocks and the like, that would operate in case of computer malfunction, over-travel exceeding normal limits, hydraulic and/or electrical failure, etc., for cutting out computer signals, throttling or cutting out hydraulic pressure, etc., and returning the cockpit to neutral for fail-safe control. As the details of such equipment would materially enlarge and complicate the disclosure, and are not required for an understanding of the present invention, disclosure thereof has been omitted.

It should be understood that this invention is not limited to specific details of construction and arrangement thereof herein illustrated, and that changes and modifications may occur to one skilled in the art without departing from the spirit of the invention.

What I claim is:

1. In flight simulating apparatus for ground training of aircraft personnel having a pilot's cockpit and flight computing means for producing signals representing flight maneuvers and movements of the simulated aircraft, apparatus for supporting and moving the cockpit with reference to a horizontal base within limits of three-degrees of freedom of motion, comprising two actuating servo systems generally disposed beneath the front end of the cockpit and aligned transversely of the longitudinal axis of the cockpit in symmetrical relation to said axis, and an actuating servo system disposed beneath the cockpit at the rear end thereof, each servo system comprising an actuator mounted on said base and individually responsive to aforesaid computer signals for producing a cockpit moving force acting generally in a direction parallel to the plane of said base, linkage mechanism interconnecting said actuator and said cockpit for supporting a corresponding part of said cockpit and for transmitting said force, and a rigid frame for stabilizing the cockpit in a lateral plane parallel to the base, said frame being pivotally mounted on said base at spaced points beneath the rear end of the cockpit and transversely of said longitudinal axis, and pivotally connected to the front end of said cockpit at a point between the front linkage supports thereof.

2. In flight simulating apparatus, cockpit supporting and moving apparatus as specified in claim 1 wherein the cockpit stabilizing frame is of A shape with the apex of the A connected by a universal joint to the front end of the cockpit, the legs of the A being pivotally mounted on the base astride the rear actuator linkage mechanisms.

3. In flight simulating apparatus, cockpit supporting and moving apparatus as specified in claim 1 wherein each actuator comprises a hydraulic motor with its housing at one end thereof pivotally connected to the base and an actuating member at the other end thereof connected to the linkage mechanism, and valve means responsive to the aforesaid computer signals for controlling the direction and speed of the motor according to the sense and magnitude of said signals.

4. In flight simulating apparatus, cockpit supporting and moving apparatus as specified in claim 1 wherein the transmitting linkage includes a bell-crank pivotally mounted on the base with one arm of the crank connected to the actuator and the other arm pivotally connected to a force transmitting strut, said strut having a universal mounting connecting it with the cockpit.

5. In flight simulating apparatus, cockpit supporting and moving apparatus as specified in claim 1 wherein each actuator can be separately actuated in varying degree for jointly with other actuators producing motions of the cockpit to represent acceleration forces in pitch, roll or vertical translation, and for returning said cockpit to a neutral position at a rate below that within the pilot's perception.

6. In flight simulating apparatus, cockpit supporting and moving apparatus as specified in claim 1 wherein the linkage interconnecting the actuator and cockpit is mounted on the base for resisting lateral forces transverse to the aforesaid axis for jointly with said rigid frame precluding transmission of lateral stresses to the actuator incident to accelerated movements of the cockpit.

7. In flight simulating apparatus, a horizontal base, a movable pilot's cockpit, cockpit supporting and moving apparatus including a plurality of actuators for producing respectively horizontal thrust, and thrust transmitting linkage for each actuator interconnecting the actuator and said cockpit, said linkage being mounted on and supported by said base independently of the respective actuator.

8. In flight simulating apparatus, cockpit supporting and moving apparatus as specified in claim 1 wherein each servo system includes a signal deriving device operatively connected to the actuator for producing a position signal in sense and magnitude corresponding to the direction and magnitude of the actuator movement from a neutral position, the resultant of said position signal and a flight computer signal representing aircraft movement causing energization of the actuator for moving the cockpit in sense and rate according to said computer signal.

9. In combination, a movable platform, a supporting base therefor, and means for bodily moving said platform within restricted limits of vertical translation, tilting about transverse and longitudinal axes of the platform and combinations of said vertical and tilting movements comprising a plurality of separate mechanical force transmitting structures pivotally mounted on said base and pivotally connected to said platform at spaced points thereon respectively, said mechanical structures supporting said platform at said points and bracing it with respect to lateral stresses incident to any sway characteristics of the platform, and an independently controlled servo actuator connected to each mechanical force transmitting structure for individual operation thereof in reciprocal direction, said servo actuator being separately mounted on said base and isolated by said force transmitting structure with respect to said lateral stresses.

References Cited by the Examiner
UNITED STATES PATENTS

| | | | |
|---|---|---|---|
| 2,661,954 | 12/1953 | Kori | 273—101.2 |
| 3,083,473 | 4/1963 | Luton | 35—12 |

FOREIGN PATENTS 561,769    8/1958    Canada.

References Cited by the Applicant
UNITED STATES PATENTS

| | | |
|---|---|---|
| 2,787,842 | 4/1957 | Smith et al. |
| 2,930,144 | 3/1960 | Fogarty. |

EUGENE R. CAPOZIO, *Primary Examiner.*

R. W. WEIG, *Assistant Examiner.*